US009128214B2

(12) United States Patent
Wakjira et al.

(10) Patent No.: US 9,128,214 B2
(45) Date of Patent: Sep. 8, 2015

(54) LOOSE FIBER RIBBONIZING TOOL AND METHOD OF RIBBONIZING OPTICAL FIBERS

(71) Applicant: US Conec, Ltd., Hickory, NC (US)

(72) Inventors: Jillcha Fekadu Wakjira, Hickory, NC (US); Shane Stamey, Hiderban, NC (US); Michael E. Hughes, Hickory, NC (US); David Thomas Underwood, Keller, TX (US)

(73) Assignee: US Conec, Ltd, Hickory, NC (US)

( * ) Notice: Subject to any disclaimer, the term of this patent is extended or adjusted under 35 U.S.C. 154(b) by 255 days.

(21) Appl. No.: 13/781,990

(22) Filed: Mar. 1, 2013

(65) Prior Publication Data

US 2013/0240124 A1 Sep. 19, 2013

Related U.S. Application Data

(60) Provisional application No. 61/605,493, filed on Mar. 1, 2012.

(51) Int. Cl.

*G02B 6/46* (2006.01)
*G02B 6/00* (2006.01)
*G02B 6/44* (2006.01)
*G02B 6/38* (2006.01)

(52) U.S. Cl.

CPC *G02B 6/00* (2013.01); *G02B 6/448* (2013.01); *G02B 6/3898* (2013.01)

(58) Field of Classification Search

CPC ..... G02B 6/3616; G02B 6/3636; G02B 6/448
USPC .................................................. 385/136, 137
See application file for complete search history.

(56) References Cited

U.S. PATENT DOCUMENTS 5,252,050 A * 10/1993 Zimmer ........................ 156/296
5,416,882 A * 5/1995 Hakoun et al. ................ 385/136

* cited by examiner

*Primary Examiner* — Jeff Aftergut
(74) *Attorney, Agent, or Firm* — Michael L. Leetzow, P.A.

(57) ABSTRACT

An optical fiber ribbonizing tool has a main body having an upper portion, a lower portion, and a thickness, the upper portion the lower portion having openings therein. The opening in the upper portion holds the optical fibers, while the opening in the lower portion allows the tool to be opened. An indentation is provided around the opening in the upper portion to hold an adhesive and to apply the adhesive as the optical fibers are drawn through the tool.

15 Claims, 5 Drawing Sheets

18 14 20 42 10 40 16 50 54 30 32 22 56 60 52

LOOSE FIBER RIBBONIZING TOOL AND METHOD OF RIBBONIZING OPTICAL FIBERS

REFERENCE TO RELATED CASE

This application claims priority under 35 U.S.C. §119 (e) to provisional application No. 61/605,493, filed on Mar. 1, 2012, which is hereby incorporated by reference in its entirety.

BACKGROUND OF THE INVENTION

Field of the Invention

Optical fibers are available in a couple of configurations. Usually the optical fibers come as individual fibers or they may come in a ribbon format. In the ribbon format, the optical fibers are positioned in a horizontal array and then coated to keep them in the horizontal array. Typically, the coating is an acrylate coating. In the individual format, the individual optical fibers are loose relative to one another. However, the technician working with the optical fibers may have one configuration and need the other. It is relatively simple to remove the acrylate coating from the fiber ribbon. However, it is more difficult to take the individual optical fibers and ribbonize them. In the past, some have used tape to ribbonize the ends of the optical fibers. There are also tools to assist, but they are expensive and time consuming to use. They also require the use of a razor blade to trim the tape, which may knick the optical fibers. Some tools have been developed to allow for ribbonizing optical fibers using adhesives. But these tools are messy and require cleaning up the adhesives after use.

Thus, a ribboning tool tool is needed that is inexpensive, easy to use and disposable, and does not have features that can damage the optical fibers.

SUMMARY OF THE INVENTION

The present invention is directed to a a main body having an upper portion, a lower portion, and a thickness, the upper portion having an upper edge and the lower portion having a lower edge, an opening extending from the lower edge in the lower portion toward the upper portion, the opening extending through the thickness of the main body, and a fiber opening extending from the upper edge toward the lower portion and extending through the thickness, the fiber opening to receive and apply adhesive to the optical fibers.

In some embodiments, the fiber opening has a first portion and a second portion, the first portion is disposed between the upper edge and the second portion of the fiber opening, the second portion aligns the optical fibers in an array.

In some embodiments, the opening in the lower portion divides the lower portion to two handles, and applying pressure on outside portions of the handles causes the fiber opening to become larger.

In some embodiments, the main body has two opposing sides, and one of the opposing sides has indentation therein adjacent to the second portion of the fiber opening to hold adhesive therein to apply to the optical fibers inserted into the optical fiber opening.

In yet other embodiments, the ribbonizing tool includes a spring member having one portion attached to a first handle on the lower portion and second portion attached to a second handle on the lower portion to bias the two handles away from one another.

In yet another aspect, the invention is directed to method of ribbonizing a plurality of single optical fibers, the plurality of single optical fibers having a length, the method includes providing a ribbonizing tool to maintain the plurality of single optical fibers in an array, inserting the plurality of single optical fibers to be ribbonized in the ribbonizing tool, disposing adhesive on the ribbonizing tool, and pulling a portion of the length of the plurality of single optical fibers through the ribbonizing tool in the presence of the adhesive to apply adhesive to the plurality of single optical fibers as they are pulled through the ribbonizing tool.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
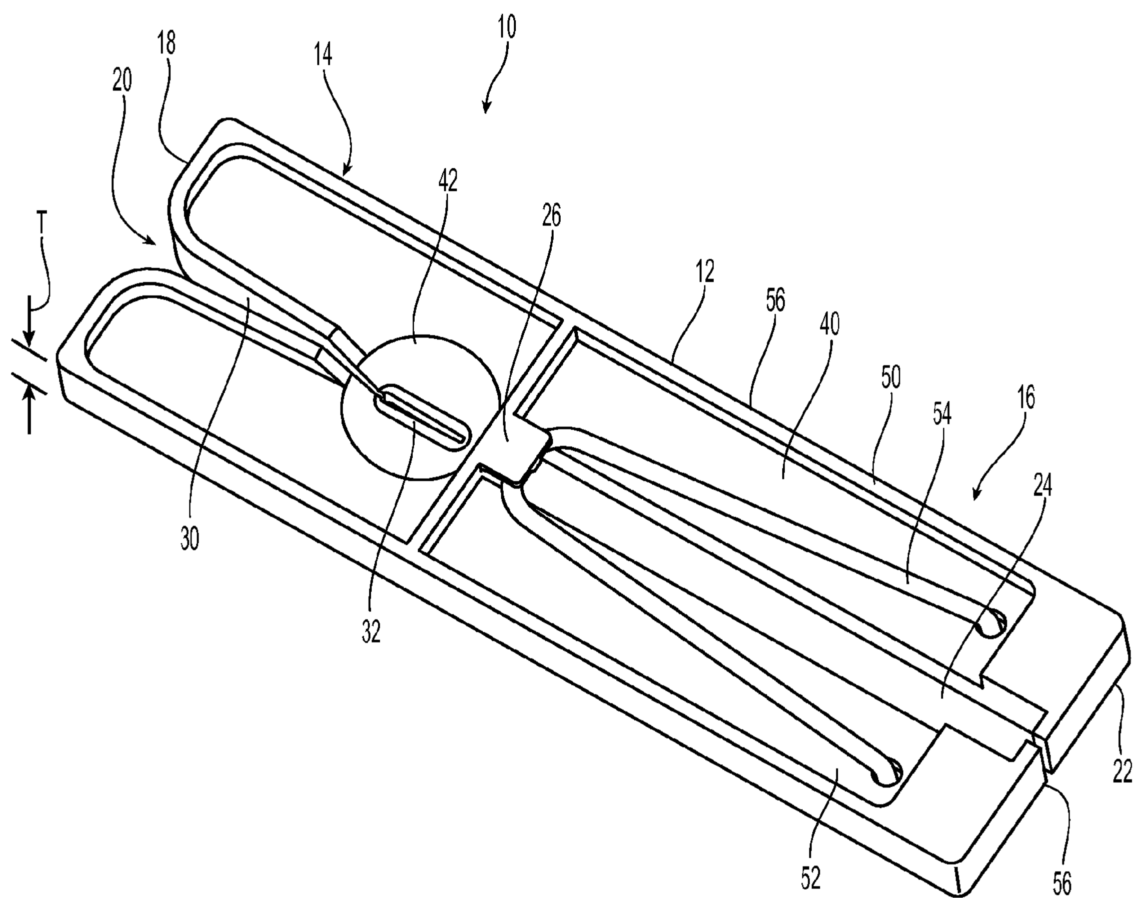
FIG. 1 is a top, front perspective view of one embodiment of an optical fiber ribbonizing tool according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-6, a ribbonizing tool 10 is illustrated for ribbonizing a plurality of single optical fibers. The ribbonizing tool 10 has a main body 12, the main body 12 has a upper portion 14 and a lower portion 16. The main body 12 also has a thickness T, which is preferably about 2.5 mm thick, although it could be thicker or thinner, depending on the durability needed, the materials used to manufacture the ribbonizing tool 10. The upper portion 14 has an upper edge 18 and a fiber opening 20 that extends from the upper edge 18 into the upper portion 14. The lower portion 16 has a lower edge 22 and an opening 24 that extends from the lower edge 22 toward the upper portion 14.

Figure 2:
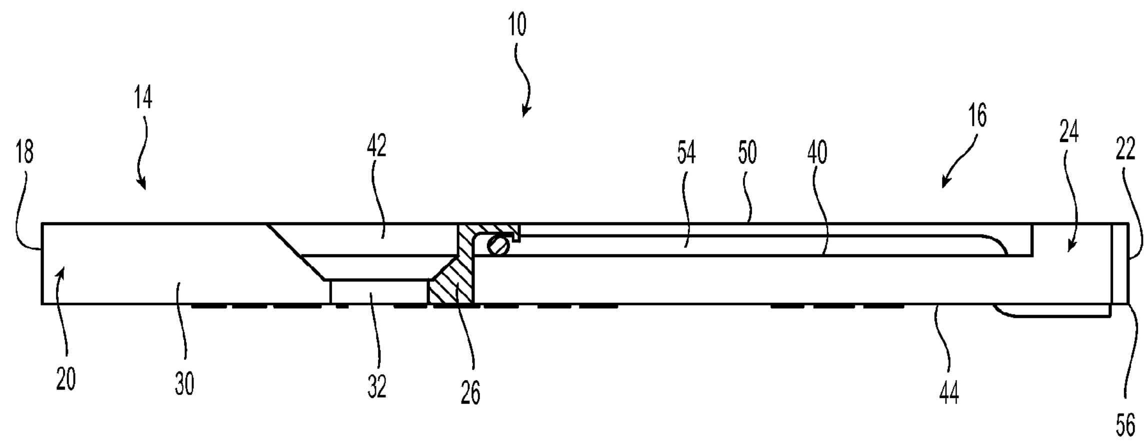
FIG. 2 is cross section view of the optical fiber ribbonizing tool of FIG. 1.

As can be seen in FIG. 2, the fiber opening 20 and the opening 24 extend through the thickness T of the main body 12, but do not connect with one another. Between the two openings is a pivot point 26, the use of which is explained below. The fiber opening 20 is also divided into an first portion 30 and a second portion 32. The first portion 30 extends from the upper edge 18 towards the lower portion 16 and the second portion 32. The first portion 30 is also preferably tapered from the upper edge 18 and gets smaller (more narrow) as it extends toward the second portion 32, but it may be of a constant width and still be within the scope of the present invention. The opening of the first portion 30 is also preferably chamfered at the upper edge 18 to assist in inserting the plurality of optical fibers into the opening 20. See, e.g., FIG. 3.

The fiber opening 20 also has a second portion 32, which is narrower and shorter (from upper edge 18 to bottom edge 22 direction on the main body 12) than the first portion 30. The second portion 32 is used to hold the optical fibers prior to and during the application of adhesive. The second portion 32 is preferably smaller than the diameter of the optical fibers so that the main body 12 keeps the optical fibers in an array. See FIG. 4. The length of the second portion 32 can be made to hold a particular number of optical fibers if so desired. In the illustrated embodiment, the second portion 32 holds 12 optical fibers. Other numbers of optical fibers could be provided for.

In the upper surface 40 of the main body 12 is an indentation 42 that surrounds the second portion 32 of the fiber opening 20. The indentation 42 preferably has a frustoconical shape, but it could be of any appropriate shape. The indentation 42, when optical fibers are inserted into the ribbonizing tool 10, hold an adhesive that is used to secure the optical fibers to one another. By "adhesive," any material that would bind the optical fibers together could be used, including, but not limited to, flexible cyanoacrylates, a water based glue, or epoxy. Alternatively, the indentation 42 could be on an opposite side, the bottom surface 44, and still be within the scope of the present invention.

The lower portion 16 also has the opening 24, which is both wider and longer than the fiber opening 20. The opening 24 divides the lower portion 16 into two handles 50 and 52. A spring member 54 is connected to each of the handles 50,52 in the lower portion to bias the handles 50,52 away from one another. The spring member 54 also spans the opening 24. By biasing the handles 50,52 away from one another, the fiber opening 20 is narrowed and will secure the optical fibers in the second portion 32. By exerting pressure on the outside portions 56 of the handles 50,52, the handles are pushed together, making the opening 24 smaller. The upper portion 14 pivots about the pivot portion 26 to open the fiber opening 20. There may be two extensions 56 that extend from each of the handles 50,52 at the lower edge 22 to prevent the handles from being pushed too far together and damaging the tool 10. The spring member 54 is also illustrated on the upper surface 40 in the figures, but it may be on the bottom surface 44. The spring member 54 is also illustrated as being on the same side of the main body 12 as the indentation 42, but they may be on opposite sides.

Figure 3:
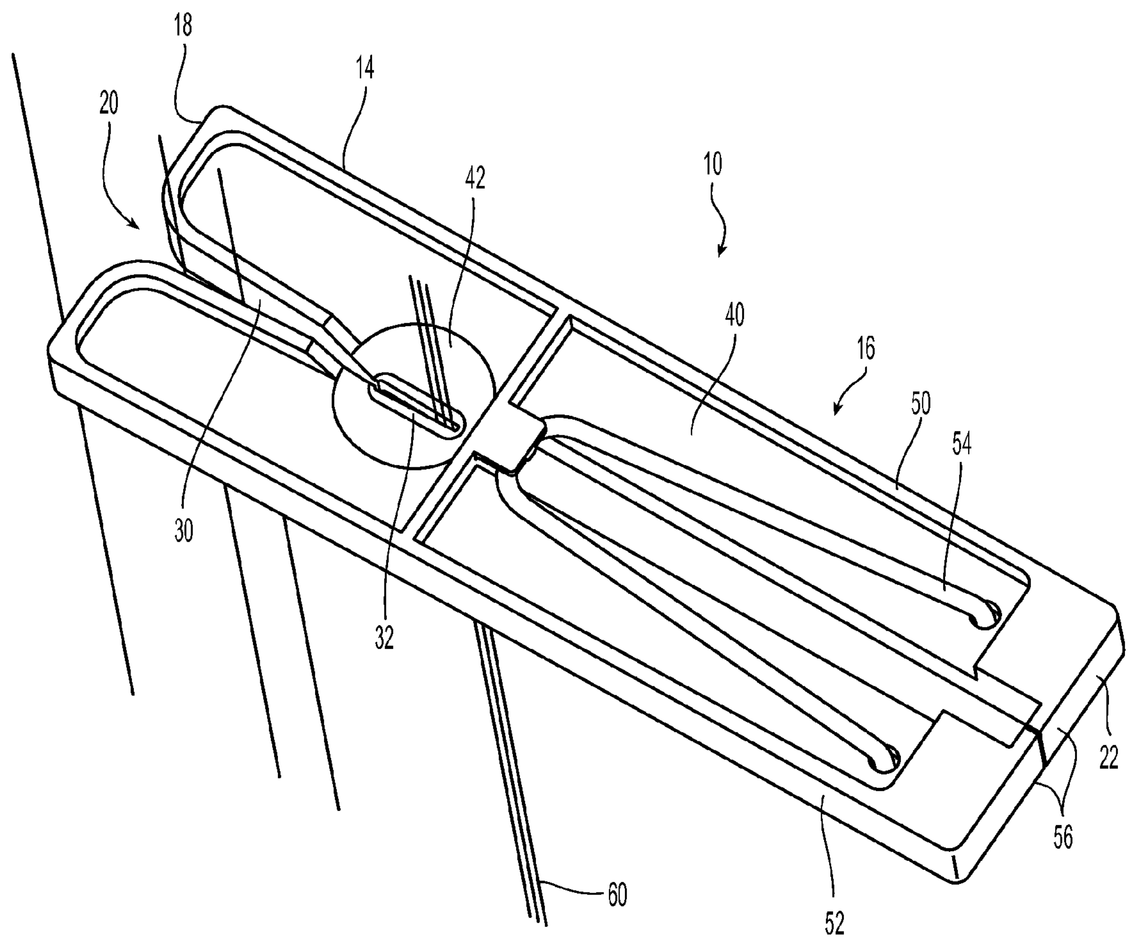
FIG. 3 is a perspective view of a plurality of single optical fibers being loaded into the optical fiber ribbonizing tool of FIG. 1.
Figure 4:
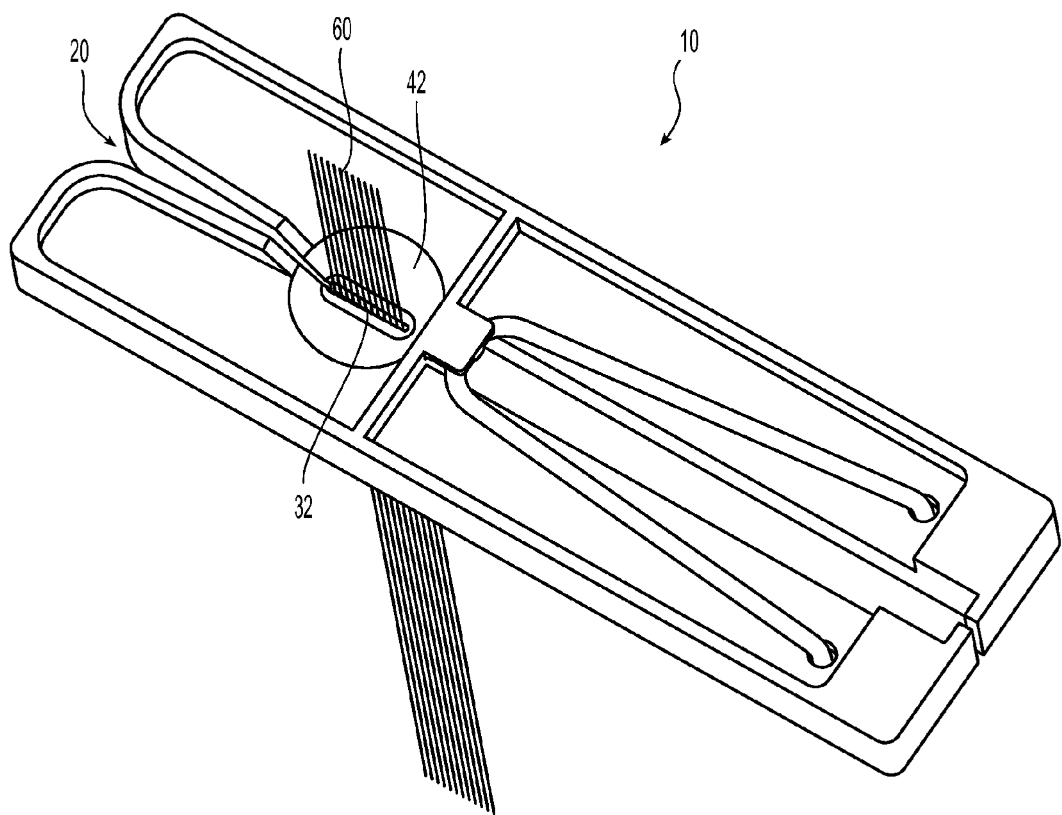
FIG. 4 is a perspective view of the plurality of single optical fibers loaded into the optical fiber ribbonizing tool of FIG. 1 and ready for ribbonizing.
Figure 5:
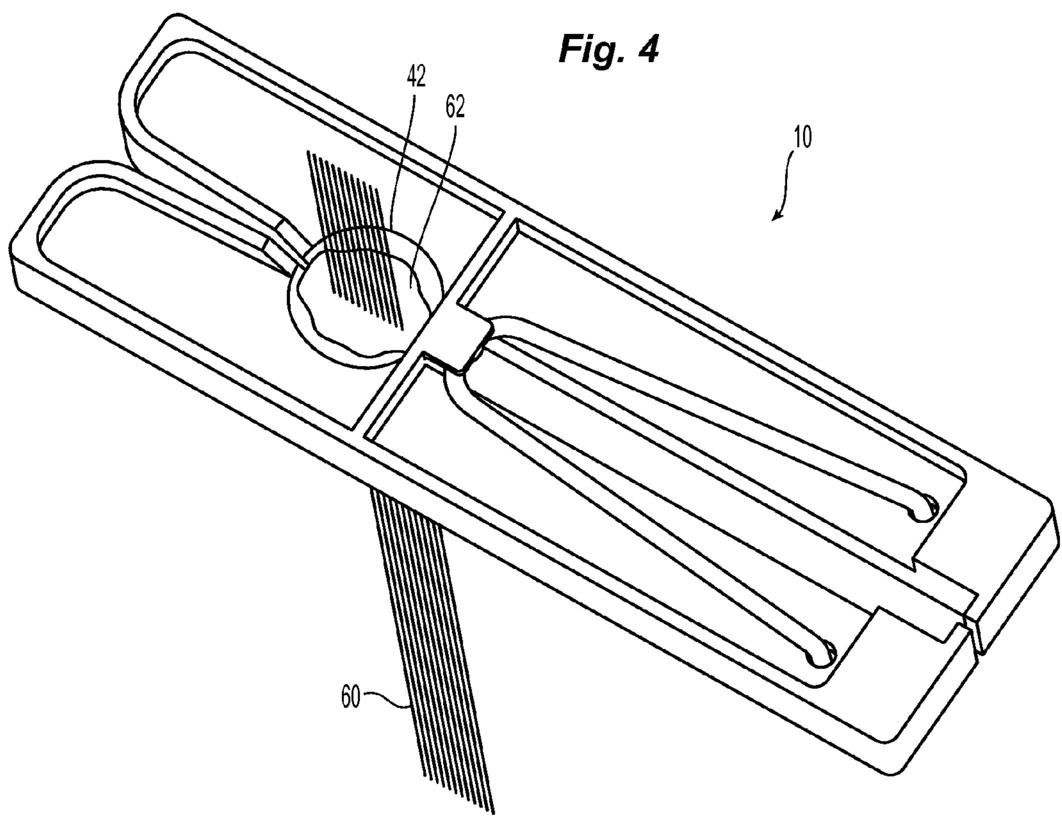
FIG. 5 is a perspective view of the plurality of single optical fibers having adhesive disposed on the ribbonizing tool before they are ribbonized.
Figure 6:
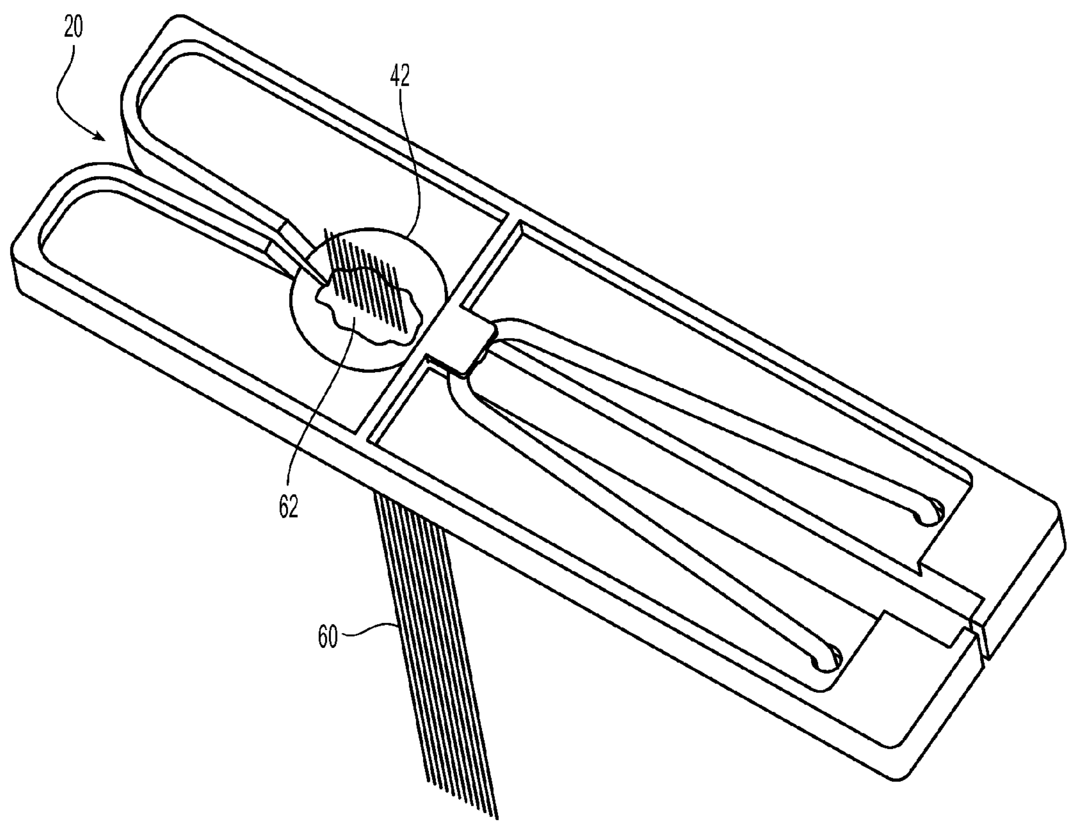
FIG. 6 is a perspective view of the plurality of single optical fibers being partially pulled through the ribbonizing tool to distribute the adhesive on the optical fibers.

Turning to FIG. 3, operation of the ribbonizing tool 10 is explained. With the handles 50,52 pushed together the fiber opening 20 is widened. A plurality of optical fibers 60 that are to be ribbonized are inserted into the fiber opening 20. The appropriate number of optical fibers 60 are inserted. After the optical fibers are inserted and aligned in an array in second portion 32, the handles 50,52 are released. The spring member 54 urges the handles 50,52 away from one another and the fiber opening 20 and in particular the second portion 32 engages the optical fibers 60 to hold them tightly therein. See FIG. 4. The lengths and/or the ends of the optical fibers 60 can be aligned as desired. An amount of adhesive 62 is then disposed in the indentation 42. With the optical fibers 60 tightly inserted in the second portion 32 of the fiber opening 20, the adhesive 62 should remain in the indentation 42. See FIG. 5. The optical fibers 60 are then pulled through the ribbonizing tool 10 and the adhesive 62 that is in the indentation 42 in a direction into the page so only the short end of the optical fibers 60 are drawn through the second portion 32 of fiber opening 20. As the optical fibers are pulled through the ribbonizing tool 10 in the presence of the adhesive 62, the adhesive 62 is applied to the optical fibers 60, causing them to be ribbonized. See FIG. 6. It should be noted that this ribbonizing tool 10 is preferably used to ribbonize only short lengths of optical fibers 60 and not to do an entire cable. Typical use of this ribbonizing tool 10 is to ribbonize the ends of optical fibers that are going to be inserted into a multi-fiber ferrule.

Figure 7:
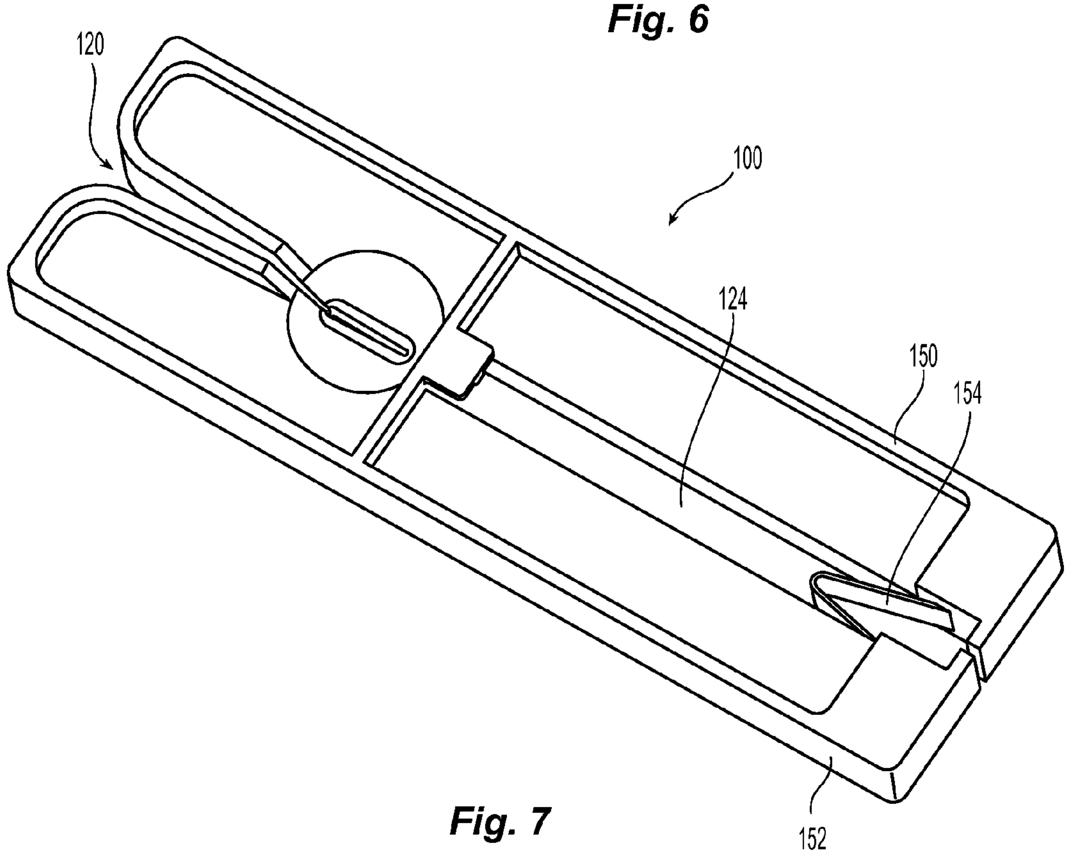
FIG. 7 is a perspective view of another embodiment of an optical fiber ribbonizing tool according to the present invention.

An alternative embodiment of a ribbonizing tool 100 is illustrated in FIG. 7. In this embodiment, the ribbonizing tool 100 has a different spring member 154, which is a leaf spring. The leaf spring also spans the opening 124 and engages the handles 150,152 to force the handles 150,152 apart and the fiber opening 120 narrowed.

Figure 8:
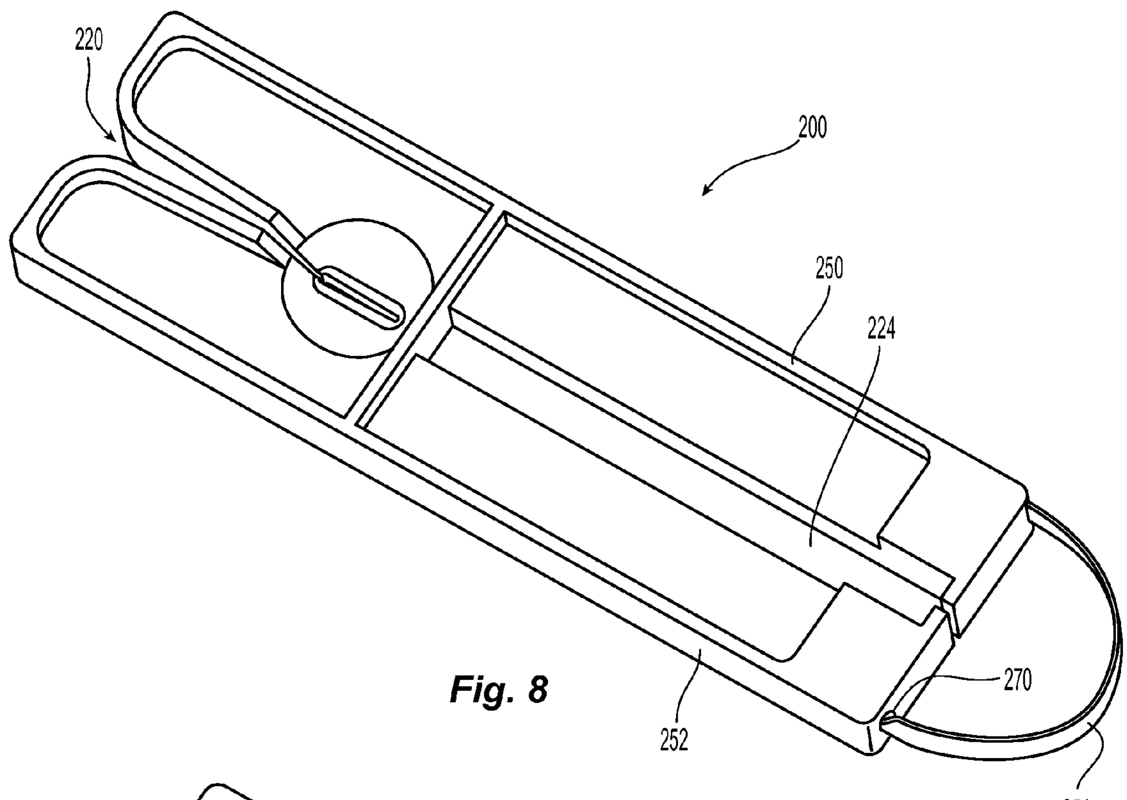
FIG. 8 is a perspective view of another embodiment of an optical fiber ribbonizing tool according to the present invention.

Yet another embodiment of a ribbonizing tool 200 is illustrated in FIG. 8. In this embodiment, the ribbonizing tool 200 has a different spring member 254, which is an extension arm that extends from one of the handles 250,252 and is inserted into an opening 270 in the other handle. The extension arm engages the handles 250,252 to force the handles 250,252 apart and the fiber opening 220 narrowed.

Figure 9:
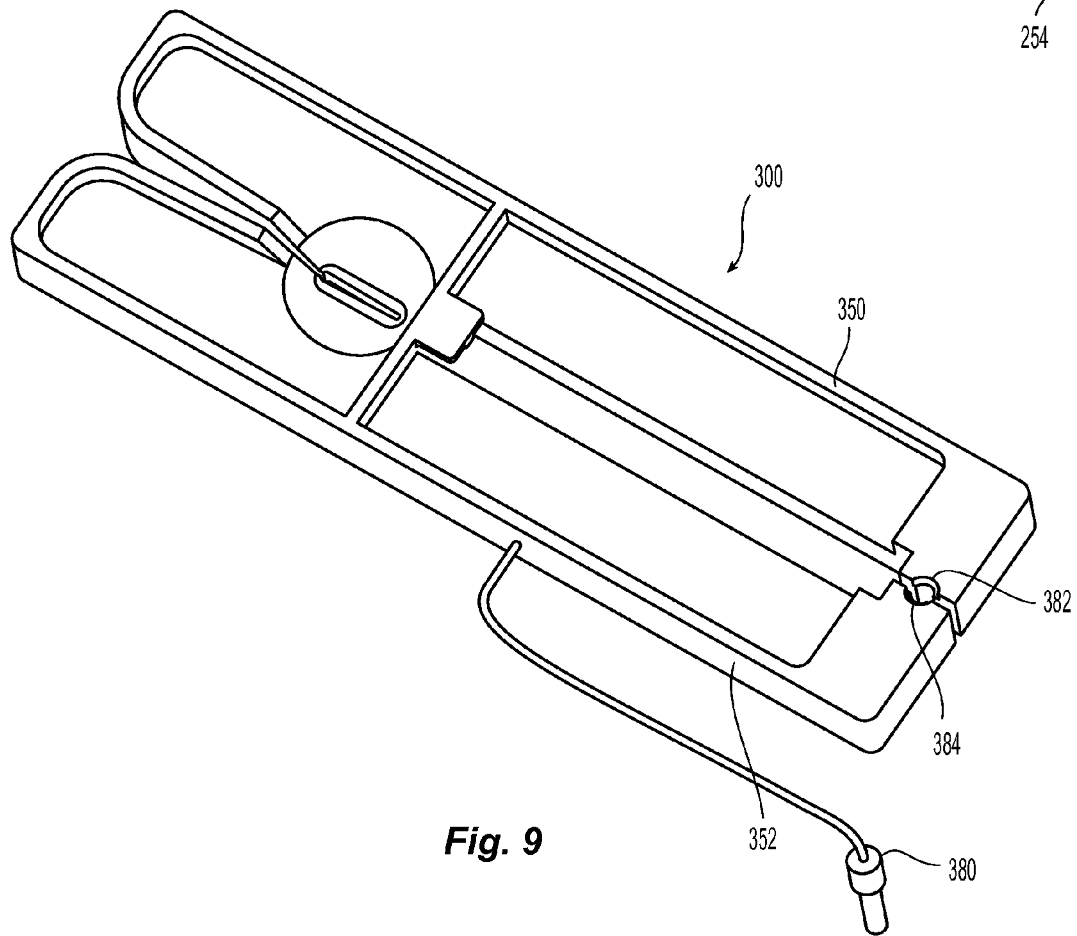
FIG. 9 is a perspective view of another embodiment of an optical fiber ribbonizing tool according to the present invention.

Another embodiment of a ribbonizing tool 300 is illustrated in FIG. 9. In this embodiment, the ribbonizing tool 300 does not have a spring member, but rather an insert 380, which engages partial openings 382,384 on the handles 350,352 to force the handles apart and not allow them to come close one another. In order to operate the ribbonizing tool 300, the insert 380 must be removed to allow the handles 350,352 to be pushed together.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A method of ribbonizing a plurality of single optical fibers, the plurality of single optical fibers having a length, the method comprising the steps of:

providing a ribbonizing tool to maintain the plurality of single optical fibers in an array, wherein the ribbonizing tool comprises;

a main body having a thickness and extending between an upper portion and a lower portion, the upper portion having an upper edge and the lower portion having a lower edge;

an opening extending from the lower edge in the lower portion toward the upper portion, the opening extending through the thickness of the main body; and a fiber opening extending from the upper edge toward the lower portion and extending through the thickness, the fiber opening having a first portion and a second portion, the first portion disposed between the upper edge and the second portion of the fiber opening;

inserting the plurality of single optical fibers to be ribbonized in the ribbonizing tool;

disposing adhesive on the ribbonizing tool; and pulling a portion of the length of the plurality of single optical fibers through the ribbonizing tool in the presence of the adhesive to apply adhesive to the plurality of single optical fibers as they are pulled through the ribbonizing tool.

2. The method according to claim 1, wherein step of disposing adhesive comprises disposing adhesive adjacent to the plurality of single optical fibers inserted into the ribbonizing tool.

3. A method of ribbonizing a plurality of single optical fibers, the plurality of single optical fibers having a length, the method comprising the steps of:

providing a ribbonizing tool to maintain the plurality of single optical fibers in an array;

inserting the plurality of single optical fibers to be ribbonized in the ribbonizing tool;

disposing adhesive on the ribbonizing tool; and pulling a portion of the length of the plurality of single optical fibers through the ribbonizing tool in the presence of the adhesive to apply adhesive to the plurality of single optical fibers as they are pulled through the ribbonizing tool, wherein step of disposing adhesive is performed before the step of inserting the plurality of optical fibers to be ribbonized in the ribbonizing tool.

4. A ribbonizing tool to ribbonize a plurality of optical fibers comprising:

a main body having a thickness and extending between an upper portion and a lower portion, the upper portion having an upper edge and the lower portion having a lower edge;

an opening extending from the lower edge in the lower portion toward the upper portion, the opening extending through the thickness of the main body; and a fiber opening extending from the upper edge toward the lower portion and extending through the thickness of the main body, the fiber opening to receive and apply adhesive to the optical fibers.

5. The ribbonizing tool according to claim 4, the fiber opening having a first portion and a second portion, the first portion disposed between the upper edge and the second portion of the fiber opening, the second portion aligning the optical fibers in an array.

6. The ribbonizing tool according to claim 5, wherein the opening in the second portion is less than the optical fiber diameter and disposed to maintain optical fibers inserted there in an array.

7. The ribbonizing tool according to claim 5, wherein the first portion has a width greater at the upper edge than at the second portion.

8. The ribbonizing tool according to claim 4, wherein the opening in the lower portion divides the lower portion to two handles, and applying pressure on outside portions of the handles causes the fiber opening to become larger.

9. The ribbonizing tool according to claim 5, wherein the main body has two opposing sides, and one of the opposing sides has indentation therein adjacent to the second portion of the fiber opening to hold adhesive therein to apply to the optical fibers inserted into the optical fiber opening.

10. The ribbonizing tool according to claim 8, further comprising a spring member having one portion attached to a first handle on the lower portion and second portion attached to a second handle on the lower portion to bias the two handles away from one another.

11. The ribbonizing tool according to claim 10, wherein the spring member biases the fiber opening in the upper portion into a closed position.

12. The ribbonizing tool according to claim 8, wherein a pivot point is disposed between the upper portion and the lower portion, and pressure on the outside portions causes rotation about the pivot point to open the fiber opening.

13. The ribbonizing tool according to claim 8, further comprising an insert, the insert engaging at least a portion of each of the two handles to prevent the handles from being pushed together.

14. The ribbonizing tool according to claim 4, wherein the fiber opening has a first width in a first position of the ribbonizing tool and a second width in a second position, the width in the first position being smaller than the width in the second position.

15. The ribbonizing tool according to claim 14, wherein the width of the fiber opening in the first position is smaller than a diameter of an optical fiber.

* * * * *